United States Patent
Sagmeister et al.

(10) Patent No.: US 12,403,759 B2
(45) Date of Patent: Sep. 2, 2025

(54) DRIVE ARRANGEMENT FOR A TRACTOR

(71) Applicant: ZF Friedrichshafen AG, Friedrichshafen (DE)

(72) Inventors: Martin Sagmeister, Passau (DE); Martin Krompass, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 580 days.

(21) Appl. No.: 17/641,172

(22) PCT Filed: Sep. 16, 2020

(86) PCT No.: PCT/EP2020/075814
§ 371 (c)(1),
(2) Date: Mar. 8, 2022

(87) PCT Pub. No.: WO2021/052985
PCT Pub. Date: Mar. 25, 2021

(65) Prior Publication Data
US 2022/0340001 A1     Oct. 27, 2022

(30) Foreign Application Priority Data

Sep. 18, 2019   (DE) ..................... 10 2019 214 202.8

(51) Int. Cl.
*F16H 3/52*     (2006.01)
*B60K 6/365*    (2007.10)
(Continued)

(52) U.S. Cl.
CPC .............. *B60K 6/40* (2013.01); *B60K 6/365* (2013.01); *B60K 6/442* (2013.01); *B60K 6/46* (2013.01);
(Continued)

(58) Field of Classification Search
CPC .............. B60K 17/28; B60K 6/36–365; B60K 6/445–547; F16H 2200/2005;
(Continued)

(56) References Cited

U.S. PATENT DOCUMENTS 5,669,842 A * 9/1997 Schmidt ................ B60K 6/365
 903/910
6,953,409 B2   10/2005 Schmidt et al.
(Continued)

FOREIGN PATENT DOCUMENTS

DE        101 33 815 A1    2/2003
DE   10 2005 044 181 A1    4/2007
(Continued)

OTHER PUBLICATIONS

German Patent Office, Search Report for Application No. 10 2019 214 202.8 (Jul. 15, 2020).
(Continued)

*Primary Examiner* — Ernesto A Suarez
*Assistant Examiner* — Lillian T Nguyen
(74) *Attorney, Agent, or Firm* — Finch & Maloney PLLC

(57) ABSTRACT

Disclosed is a drive arrangement for a tractor. In one example, the drive arrangement includes a first powertrain, a power take-off for driving a coupled attachment unit, and/or including a pump power take off for driving at least one hydraulic pump. A second powertrain has a vehicle transmission with at least one transmission output for driving at least one vehicle axle. A first electric machine can be coupled in terms of drive to the first powertrain. A second electric machine can be coupled in terms of drive to the second powertrain.

15 Claims, 5 Drawing Sheets

(51) Int. Cl.
*B60K 6/40* (2007.10)
*B60K 6/442* (2007.10)
*B60K 6/46* (2007.10)
*B60K 6/52* (2007.10)
*B60K 6/547* (2007.10)
*B60K 17/28* (2006.01)
*B60K 25/02* (2006.01)
*F16H 37/04* (2006.01)

(52) U.S. Cl.
CPC ............... *B60K 6/52* (2013.01); *B60K 6/547* (2013.01); *B60K 17/28* (2013.01); *B60K 25/02* (2013.01); *F16H 37/04* (2013.01); *B60K 2025/022* (2013.01); *B60Y 2200/92* (2013.01)

(58) Field of Classification Search
CPC ...... F16H 3/52–3/54; F16H 2200/2035; F16H 2200/2038
See application file for complete search history.

(56) References Cited

U.S. PATENT DOCUMENTS

| | | | |
|---|---|---|---|
| 8,469,127 B2 * | 6/2013 | Tarasinski | B60K 6/26 180/65.285 |
| 8,573,340 B2 | 11/2013 | Tarasinski et al. | |
| 8,944,194 B2 | 2/2015 | Glaser et al. | |
| 10,479,187 B2 | 11/2019 | Lubben et al. | |
| 2010/0170732 A1 * | 7/2010 | Glaser | F16H 37/065 180/65.245 |
| 2013/0066496 A1 * | 3/2013 | Ishii | B60W 10/30 903/930 |
| 2019/0337376 A1 * | 11/2019 | Ore | B60K 6/365 |
| 2020/0318713 A1 * | 10/2020 | Beck | B60K 6/445 |
| 2022/0340001 A1 | 10/2022 | Sagmeister et al. | |

FOREIGN PATENT DOCUMENTS

| | | |
|---|---|---|
| DE | 10 2005 044 180 A1 | 9/2007 |
| DE | 10 2016 204 727 A1 | 9/2017 |
| DE | 10 2018 218 078 A1 | 5/2019 |
| DE | 10 2018 206 411 A1 | 10/2019 |
| JP | 2012149769 A | 8/2012 |
| WO | 2020/120721 A1 | 6/2020 |

OTHER PUBLICATIONS

European Patent Office, International Search Report, PCT Application No. PCT/EP2020/075814 (Nov. 19, 2020).

European Patent Office, Written Opinion, PCT Application No. PCT/EP2020/075814 (Nov. 19, 2020).

* cited by examiner

DRIVE ARRANGEMENT FOR A TRACTOR

RELATED APPLICATIONS

This application claims the benefit under 35 U.S.C. § 371 as a U.S. National Application of PCT application no. PCT/EP2020/075814, filed on 16 Sep. 2020, which claims priority to German patent application no. 10 2019 214 202.8, filed 18 Sep. 2019, the contents of which are hereby incorporated herein by reference in their entireties.

FIELD OF THE DISCLOSURE

The invention relates to a drive arrangement for a tractor having the features of the preamble of claim 1.

BACKGROUND

Electrified drives are known for driving tractors, in particular agricultural tractors, said electrified drives providing a drive torque, in particular for at least one vehicle axle and/or a power take-off, via a power-split transmission, for example a CVT transmission.

The publication DE 102016204727 A1, which probably forms the closest prior art, discloses a continuously variable power-split transmission for a vehicle, wherein the transmission is provided to connect a drive machine arranged on the input side at least indirectly via a transmission input shaft to a power take-off shaft provided for the output. The transmission comprises an electrical variator with a first and a second electric machine for the continuously variable adjustment of a gear ratio and for producing at least one driving range, wherein the first electric machine is connected at least indirectly to a first sun gear of a stepped planetary gear set and the second electric machine is connected at least indirectly to a first ring gear of the stepped planetary gear set. The output shaft is able to be coupled at least indirectly to a second sun gear of the stepped planetary gear set, wherein the transmission input shaft is connected fixedly in terms of rotation to a planet carrier of the stepped planetary gear set. Moreover, the stepped planetary gear set has a plurality of stepped gears which are rotatably mounted on the planet carrier, wherein the respective stepped gear has a first and second planetary gear stage, wherein the first planetary gear stage meshes with the first ring gear and the first sun gear, and wherein the second planetary gear stage meshes with at least the second sun gear.

SUMMARY

The object of the invention is to provide a drive arrangement of the type mentioned in the introduction which is characterized by a compact construction and which also permits different energy supplies.

This object is achieved according to the invention by a drive arrangement having the features recited in the independent claims. Advantageous embodiments emerge from the dependent claims, the drawings, and/or the description.

The subject of the invention is a drive arrangement which is configured and/or is suitable for a tractor. In particular, the drive arrangement serves for driving the tractor and for transmitting energy to at least one attachment unit which is couplable and/or is coupled to the tractor.

The drive arrangement comprises a first powertrain. In particular, the first powertrain serves for transmitting energy to consumers of the tractor and/or the at least one attachment unit. The first powertrain has at least one, or exactly one, power take-off, in particular a power take-off shaft, which is configured and/or is suitable for driving the attachment unit which is couplable to the tractor. In particular, the power take-off forms a mechanical drive source for the attachment unit. The at least one power take-off may be selectively arranged on the front side or rear side of the tractor. Optionally the first powertrain may have a further power take-off, wherein the one power take-off is arranged on the front side and the other power take-off is arranged on the rear side of the tractor. The attachment unit may be an attachment unit which is towed or carried by the tractor or which is stationary, and which is able to be driven and/or is driven at the same time via the power take-off.

Alternatively, or optionally additionally, the first powertrain has a pump power take-off which is configured and/or is suitable for driving at least one, or exactly one, hydraulic pump. In particular, the hydraulic pump forms a hydraulic drive source for the attachment unit. For example, to this end the pump is configured as an, in particular variable, lifting gear pump. Alternatively, the hydraulic pump or optionally a further hydraulic pump forms a steering pump for hydraulic steering assistance. Alternatively, the hydraulic pump or optionally a further hydraulic pump forms an, in particular variable, gear pump for power transmission. Alternatively, the hydraulic pump or optionally a further hydraulic pump forms an, in particular variable or constant, system pressure pump. Alternatively, however, the system pressure pump may also be designed as an electric pump which may be operated independently of the pump power take-off.

The drive arrangement comprises a second powertrain. In particular, the second powertrain serves for driving the tractor. The second powertrain has a vehicle transmission, in particular a manual transmission, which serves, in particular, for transmitting a drive torque to the driven wheels of the tractor. The vehicle transmission has at least one, or exactly one, transmission output which is formed and/or is suitable for driving at least one, or exactly one, vehicle axle. In particular, the vehicle axle is a driven rear axle or alternatively a driven front axle of the tractor.

The drive arrangement comprises a first and a second electric machine. In particular, the two electric machines are configured in each case as a rotating electric machine. Preferably, the two electric machines have in each case a motor shaft, via which the two electric machines are and/or may be mechanically integrated in the drive arrangement.

Within the context of the invention it is proposed that the first electric machine is coupled and/or couplable in terms of drive to the first powertrain and the second electric machine is coupled and/or is couplable in terms of drive to the second powertrain. In particular, the drive arrangement has at least one power control for the first and second electric machine. The at least one power control serves, in particular, to control the operation of the two electric machines. In particular, the two electric machines have in each case integrated power electronics as the power control.

The advantage of the invention, in particular, is that due to the two electric machines a drive architecture which permits different energy supplies is proposed. Due to the two electric machines, the two powertrains may also be operated independently of one another in terms of gearing, so that the two powertrains may be designed in a manner which is simple and which saves installation space. Thus a drive arrangement which provides the required installation space, in particular for the power electronics, energy supply, etc. is proposed, whilst maintaining standard interfaces.

In a preferred embodiment of the invention it is provided that the drive arrangement has an internal combustion engine, in particular a combustion engine, in particular a diesel engine. Preferably, the internal combustion engine serves for forming a hybrid drive. To this end, the internal combustion engine is operatively connected to one of the two electric machines, wherein the corresponding electric machine is able to be operated in a generator mode for generating electrical energy.

In particular, the internal combustion engine forms together with the two electric machines a series hybrid drive. In this case, the electric machine which is operatively connected to the internal combustion engine is configured as a generator and the other electric machine is configured as an electric motor, wherein the electric motor is energized by the electrical energy generated in the generator mode of the generator.

Alternatively, it may be provided that the internal combustion engine forms together with the electric machine, which is operatively connected thereto, a parallel hybrid drive. In this case, the electric machine which is operatively connected to the internal combustion engine may be operated both as a generator and as an electric motor, wherein the internal combustion engine and the electric machine act together on the associated powertrain in a motor mode and electrical energy is provided in a generator mode of the other electric machine.

In a preferred embodiment, it is provided that the first electric machine is configured at least as a generator and the second electric machine is configured as an electric motor. The first powertrain is able to be driven by the internal combustion engine and/or is driven thereby, wherein the first electric machine which is configured as the generator is operatively connected, in particular indirectly and/or in terms of gear technology, to the internal combustion engine. In particular, the internal combustion engine and the first electric machine form a hybrid drive, in particular a diesel-electric drive, for the first powertrain. The second powertrain is able to be driven by the electric motor and/or is driven thereby. In particular, the second electric machine forms an electric drive for the second powertrain. In a generator mode of the first electric machine, electrical energy is provided for the second electric machine which is configured as an electric motor and/or for further consumers. Thus a drive arrangement which is characterized by a particularly efficient drive architecture is proposed, due to the electric drive of the tractor and a hybrid drive of the power take-off or pump power take-off.

In an alternative embodiment, it is provided that the first electric machine is configured as an electric motor and the second electric machine is configured as a generator. The second powertrain is able to be driven by the internal combustion engine and/or is driven thereby, wherein the second electric machine which is configured as a generator is operatively connected, in particular indirectly and/or in terms of gear technology, to the internal combustion engine. In particular, the internal combustion engine and the second electric machine form a hybrid drive, in particular a diesel-electric drive, for the second powertrain. The first powertrain is able to be driven by the electric motor and/or is driven thereby. In particular, the first electric machine forms an electric drive for the first powertrain. In a generator mode of the second electric machine, electrical energy is provided for the first electric machine which is configured as an electric motor and/or for further consumers. Thus a drive arrangement which is characterized by an alternative drive architecture is proposed, due to the hybrid drive of the tractor and the electric drive of the power take-off or pump power take-off.

In an alternative embodiment of the invention, it is provided that the first electric machine is configured and/or is suitable for generating a first drive torque and that the second electric machine is configured and/or is suitable for generating a second drive torque, in each case as an electric motor. In this case, the first powertrain is able to be driven by the first electric machine which is configured as an electric motor and/or is driven thereby, and the second powertrain is able to be driven by the second electric machine which is configured as an electric motor and/or is driven thereby. In particular, therefore, the first electric machine forms an electric drive for the first powertrain and the second electric machine forms an electric drive for the second powertrain. Thus a drive arrangement which is characterized by a purely electric drive architecture is proposed, due to the electric drive of the tractor and the power take-off or pump power take-off, said drive arrangement additionally freeing up further installation space due to the absence of the internal combustion engine.

In a further embodiment, it is provided that the drive arrangement has an energy supply unit which is configured and/or is suitable for storing and/or providing electrical energy. To this end, the first and the second electric machines are connected in terms of supply technology to the energy supply unit. In particular, the energy supply unit comprises at least one, or exactly one, energy store, preferably an electrical accumulator. Preferably, in a motor mode of the at least one electric machine which is configured as an electric motor, the at least one energy store has the function of supplying this electric machine with electrical energy and/or for receiving and/or for storing electrical energy in a generator mode of the at least one electric machine which is configured as a generator. In particular, in an embodiment of the two electric machines as electric motors, the energy store may supply the two electric motors with electrical energy and/or may be charged by at least one of the two electric motors by recuperation. Alternatively, or optionally additionally, the energy supply unit comprises an energy converter, preferably a fuel cell. Preferably, the energy converter has the function of supplying the electric machine(s) which is (are) configured as the electric motor(s) and/or the energy store with electrical energy. Alternatively, or optionally additionally, the energy supply unit may have an external energy supply interface, for example a cable connection. Preferably, the external energy supply interface has the function of supplying the electric machine(s) which is (are) configured as the electric motor(s) and/or the energy store with electrical energy.

In a first possible embodiment, it is provided that the first and the second powertrains are separated from one another in terms of gearing. In particular, the two powertrains are arranged parallel to one another in the tractor. Preferably, the two powertrains are driven and/or drivable independently of one another.

In an alternative embodiment, it is provided that the first powertrain and the second powertrain are connected and/or connectable to one another in terms of gearing via the vehicle transmission, so that the drive torques of the first and the second powertrains are able to be added together. Preferably, a power split is implemented by the geared connection of the first powertrain to the second powertrain. In particular, the two powertrains are mechanically connected together via at least one gear stage. Optionally, the two powertrains may be coupled together via a coupling device for the power split and decoupled from one another for the direct drive.

In a preferred embodiment, it is provided that the vehicle transmission has a vehicle transmission input shaft for connecting the second electric machine, a vehicle transmission output shaft for forming the at least one transmission output as well as a first and a second coupling device. In particular, the vehicle transmission input shaft is formed by the motor shaft of the second electric machine or is coupled and/or couplable fixedly in terms of rotation thereto. In particular, the at least one vehicle transmission output shaft is connected in terms of gear technology to a vehicle axle transmission, in particular a differential transmission, of the vehicle axle. The two vehicle transmission shafts are preferably arranged axially parallel to one another. Particularly preferably, the vehicle transmission is configured as a dual clutch transmission. In this case, the first coupling device is assigned to the vehicle transmission input shaft and the second coupling device is assigned to the vehicle transmission output shaft. In particular, a drive torque transmitted to the vehicle transmission input shaft is selectively transmitted via one of the two coupling devices to the vehicle transmission output shaft. For example, the two coupling devices are configured as power-shiftable and/or non-positive clutches, in particular as multiplate clutches.

According to this embodiment, a coupling half of the first coupling device has a first toothed portion and a coupling half of the second coupling device has a second toothed portion. In particular, the first and/or the second toothed portion are configured as a spur toothing system arranged on the associated coupling half or as a gearwheel, in particular a spur gear, connected fixedly in terms of rotation to the associated coupling half. In this case the first toothed portion is connected in terms of gear technology via at least one, or exactly one, gear stage to the vehicle transmission output shaft and the second toothed portion is connected in terms of gear technology via at least one, or exactly one, further gear stage to the vehicle transmission input shaft. In particular, the first toothed portion forms an input interface in a first partial transmission and the second toothed portion forms an input interface in a second partial transmission of the vehicle transmission which is configured as dual clutch transmission.

In a development it is provided that the vehicle transmission has a planetary gear which has a sun gear, a ring gear, a planet carrier as well as a plurality of planet gears which are rotatably mounted on the planet carrier. In particular, the planetary gear is arranged coaxially to the vehicle transmission output shaft. Preferably, the sun gear is configured as a stepped ring gear, wherein the vehicle transmission output shaft is guided through the sun gear. The sun gear has a sun gear portion and a first spur gear portion. In particular, the sun gear is configured as a stepped gear, wherein the sun gear portion is formed by a first stage of the stepped gear and the first spur gear portion is formed by a second stage of the stepped gear. Alternatively, the sun gear portion and the first spur gear portion may be formed in each case by a separate gearwheel, connected together fixedly in terms of rotation. The sun gear portion is in engagement with the planet gears for forming a planetary stage and the first spur gear portion is in engagement with the first toothed portion of the first coupling device for forming a first spur gear stage. In particular, the planetary stage and the first spur gear stage have a different gear ratio, so that a first gear stage is formed by the planetary stage and a second gear stage is formed by the first spur gear stage.

In a further embodiment, it is provided that the vehicle transmission has a first and a second switching element. In particular, the first and/or the second switching elements are configured as a non-positive switching element, in particular as a friction clutch, or as a positive switching element, in particular as a claw clutch. The two switching elements are movable in each case between a release position and a switching position. In particular, the two switching elements are arranged so as to be axially movable on the vehicle transmission output shaft and so as to be fixed in terms of rotation in the direction of rotation. The first switching element in the switching position is coupled fixedly in terms of rotation to the planet carrier, so that in a closed state of the first coupling device a torque path runs from the vehicle transmission input shaft via the planetary stage, in particular via the planet carrier, to the vehicle transmission output shaft. The second switching element in the switching position is coupled fixedly in terms of rotation to the first spur gear portion, so that in a closed state of the first coupling device a torque path runs from the vehicle transmission input shaft via the first spur gear stage to the vehicle transmission output shaft. In particular, one of the two switching elements is selectively in the switching position, wherein the other switching element is in the idling position. In the closed state of the coupling device, therefore, one of the two gear stages may be selected via the switching elements.

In a further implementation, it may be provided that the first powertrain has a transmission gear which is configured and/or is suitable for transmitting a drive torque, in particular of the internal combustion engine and/or the first electric machine, to the power take-off and/or the pump power take-off. In particular, the transmission gear is configured as a spur gear mechanism. The transmission gear has at least one, or exactly one, transmission gear input shaft which is configured and/or is suitable for connecting the first electric machine. Optionally, the transmission gear has a further transmission gear input shaft which is configured and/or is suitable for connecting the internal combustion engine. In particular, the transmission gear input shaft is coupled and/or couplable in terms of drive to the first electric machine and the further transmission gear input shaft is coupled and/or couplable in terms of drive to the internal combustion engine. Preferably, the two transmission gear input shafts are connected together in terms of gearing via at least one, or exactly one, transmission gear stage.

In parallel hybrid drive, the first electric machine and the internal combustion engine act together via the transmission gear on the first powertrain. In particular, in motor mode of the first electric machine the transmission gear input shaft thus serves for transmitting the drive torque to the first powertrain.

In series hybrid drive, the drive torque generated by the internal combustion engine is transmitted or transferred via the transmission gear to the electric machine which is configured as the generator. In particular, in generator mode of the first electric machine the transmission gear input shaft thus serves for transmitting the drive torque to the first electric machine so that the transmission gear input shaft undertakes the function of an output shaft.

Particularly preferably, the transmission gear has a transmission gear output shaft for forming the power take-off and at least one, or exactly one, further transmission gear output shaft for forming the pump power take-off. In particular, the transmission gear input shaft and/or the further transmission gear input shaft are connected in terms of gearing to the transmission gear output shaft and/or the further transmission gear input shaft via at least one, or exactly one, further transmission gear stage. Preferably, the transmission gear output shaft forms a transmission input into a further transmission gear, in particular a PTO transmission, for the power take-off. Preferably, the further transmission gear output shaft is operatively connected to one or more pumps so that the at least one pump is driven when the drive torque is transmitted. In particular, the transmission gear has a plurality of the further transmission gear output shafts for forming further pump power take-offs for further pumps. In particular, the further transmission gear input shaft and the transmission gear output shaft are formed together by one shaft so that these shafts rotate at the same rotational speed about a common rotational axis.

In one possible development it is provided that the first powertrain has a gearwheel portion and that the ring gear has an external toothing. In particular, the gearwheel portion is connected fixedly in terms of rotation to the transmission gear output shaft. Preferably, the gearwheel portion, in particular in a further torque path, is arranged between the transmission gear and the further transmission gear. For example, the gearwheel portion is configured as a separate gearwheel, preferably a spur gear. Alternatively, the gearwheel portion is configured as a toothing which is integrally formed, in particular, on the transmission gear output shaft.

According to this embodiment, it is provided that the gearwheel portion of the first powertrain is in engagement and/or may be brought into engagement with the external toothing of the ring gear. In particular, the gearwheel portion serves to connect together the two powertrains in terms of gearing. The ring gear in this case is rotatable around the vehicle transmission output shaft so that the gearwheel portion meshes with the ring gear during the operation of the first electric machine and/or the internal combustion engine. In the switching position of the first switching element, a further torque path runs from the first powertrain via the gearwheel portion to the planetary gear. In particular, the planetary gear thus serves as a summation gear, wherein the power(s) of the first electric machine and/or the internal combustion engine and the second electric machine are combined. Optionally a locking device, for example a further switching element and/or a further coupling device, which is configured and/or is suitable for locking the ring gear may be provided. Thus in the switching position of the first switching element the locking device may switch the second powertrain selectively between a power split and a direct electric drive. In particular, via the locking device the first and the second powertrain may be selectively with one another in terms of gearing or separated from one another in terms of gearing. By means of the power split the efficiency may be significantly improved, in particular in the first gear stage.

In a further embodiment, it is provided that the vehicle transmission input shaft has a second spur gear portion. In particular, the second spur gear portion is arranged in the torque path upstream of the first coupling device so that, in particular in an open state of the first coupling device, the second spur gear portion is entrained by the vehicle transmission input shaft. Preferably, the second spur gear portion is formed by a spur gear which is connected fixedly in terms of rotation to the vehicle transmission input shaft. Alternatively, however, the second spur gear portion may also be formed by a spur gear contour which is correspondingly integrally formed on the vehicle transmission input shaft. The second spur gear portion is in engagement with the second toothed portion of the second coupling device for forming a second spur gear stage, so that in a closed state of the second coupling device a torque path runs from the vehicle transmission input shaft via the second spur gear stage to the vehicle transmission output shaft. In particular, the planetary stage and the two spur gear stages have different gear ratios so that a total of three different gear stages are formed. In particular, one of the two coupling devices is selectively closed, wherein the other coupling device is open. Thus one of the three gear stages may be selected as a function of the two coupling devices and the two switching elements. Optionally, it may be provided that the vehicle transmission has a third spur gear stage for forming a further gear stage which may be selected via a further switching element.

In a further embodiment of the invention it is provided that the vehicle transmission has a further transmission output for driving at least one, or exactly one, further vehicle axle. In particular, the further vehicle axle is a front axle of the tractor. The further vehicle axle is connected via a further coupling device to the further transmission output, so that in a closed state of the further coupling device the further vehicle axle is driven and in an open state of the further coupling device the further vehicle axle is not driven. In particular, in the closed state of the further coupling device, an all-wheel drive is implemented for the tractor. Preferably, the further coupling device is configured as a power-switchable and/or non-positive clutch, in particular a multiplate clutch.

In a development it is provided that the vehicle transmission output shaft has a further spur gear portion and a coupling half of the further coupling device has a further toothed portion. In particular, the further spur gear portion and/or the further toothed portion is configured as a gearwheel, in particular as a spur gear or as a corresponding spur toothing system. The further spur gear portion and the further toothed portion are in engagement with one another for forming a further spur gear stage. In particular, in a closed state of the first or the second coupling device the torque path is divided via the vehicle transmission output shaft, wherein a partial torque path runs on the transmission output to the vehicle axle which is preferably configured as a rear axle, and a further partial torque path runs on the further transmission output via the further spur gear stage and the further coupling device to the further vehicle axle which is preferably configured as a front axle.

Optionally, a further subject of the invention is a tractor with the drive arrangement as has been already described above. In particular, the tractor is configured as a farm tractor, in particular an agricultural tractor. Preferably, an electric or diesel-electric drive is implemented by the drive arrangement.

BRIEF DESCRIPTION OF THE DRAWINGS

Further features, advantages and effects of the invention emerge from the following description of preferred exemplary embodiments of the invention, in which.

DETAILED DESCRIPTION

Figure 1:
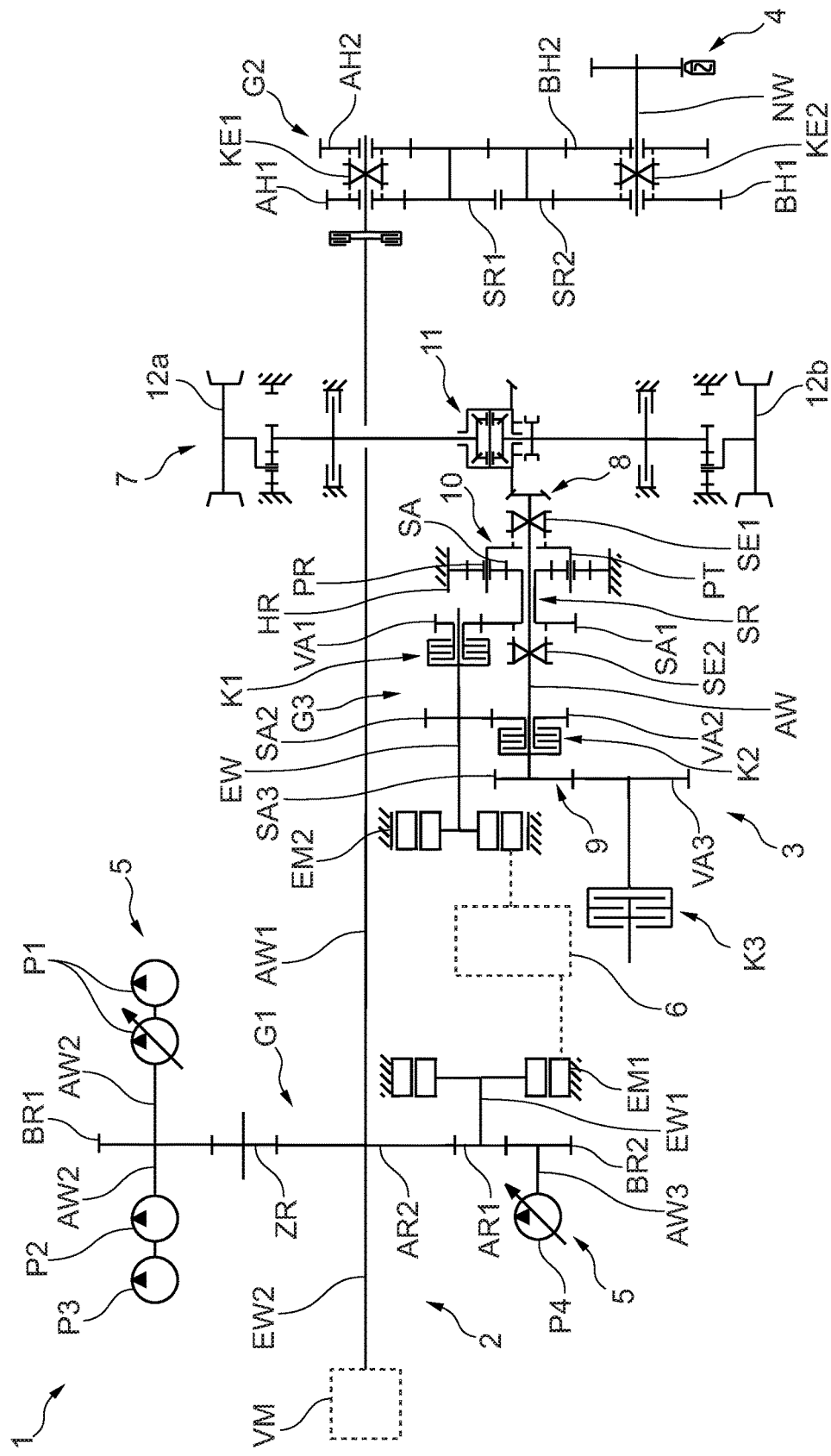
FIG. 1 shows a schematic view of a drive arrangement for a tractor as an exemplary embodiment of the invention.

FIG. 1 shows in a highly schematic view a drive arrangement 1 for a tractor, not shown, as an exemplary embodiment of the invention. For example, the tractor is configured as an agricultural tractor. The drive arrangement has a first and a second powertrain 2, 3, wherein the first and the second powertrains 2, 3 are separated from one another in terms of gearing.

Current solutions for electrified drives are only suitable to a limited degree for the different energy supplies on the agricultural tractor, for example for a diesel engine or battery, and are not able to be undertaken without significant adjustments. Additionally, the installation space required by current approaches is significantly higher than in the case of currently used agricultural tractor transmissions, so that an integration of the electrified drive in existing agricultural tractor designs is only possible with great difficulty. Associated with the high requirement for installation space is the high degree of complexity of the powertrain with a plurality of planetary gear sets and switching elements. Approaches via individual wheel drives, for example, require new vehicle designs and are very expensive at the initial stage, since only some of the drives will be designed to be electrified and the majority will remain conventional in the medium term.

According to the invention a drive arrangement 1 is proposed, said drive arrangement permitting different energy supplies, providing the standard interfaces of the current agricultural tractor transmission and additionally providing the required installation space for the power electronics, for example, without exceeding the current installation space limits of standard transmissions. This drive arrangement 1 is described hereinafter with reference to that of FIG. 1.

The first powertrain 2 serves for providing energy to different consumers of the tractor. To this end, the first powertrain 2 has a power take-off 4 for driving a working implement which is mechanically couplable or coupled to the tractor or which is stationary, and a pump power take-off 4 for driving a plurality of pumps P1, P2, P3, P4. Additionally, the first powertrain 2 has an internal combustion engine VM, only shown schematically, and a first electric machine EM1 including power electronics, which are operatively connected together via a transmission gear G1. For example, the internal combustion engine VM is configured as a diesel engine and the first electric machine EM1 as a generator and/or as an electric motor. For example, the transmission gear G1 is configured as a spur gear mechanism.

The transmission gear G1 has a transmission gear input shaft EW1 for connecting the first electric machine, and a further transmission gear input shaft EW2 for connecting the internal combustion engine VM, and a transmission gear output shaft AW1 for forming the power take-off 4 and further transmission gear output shafts AW2, AW3 for forming the pump power take-off 5. The transmission gear G1 has a drive gear AR1 and a further drive gear AR2, wherein the two drive gears AR1, AR2 are in engagement with one another for forming a gear stage. In this case, the drive gear AR1 is connected fixedly in terms of rotation via the transmission gear input shaft EW1 to the first electric machine EM1 and the further drive gear AR2 is connected fixedly in terms of rotation via the further transmission gear input shaft EW2 to the internal combustion engine VM. In particular, the further transmission gear input shaft EW2 and the transmission gear output shaft AW1 form a common shaft, wherein the further drive gear AR2 is arranged fixedly in terms of rotation on the shaft. The further transmission gear input shaft EW2 and the transmission gear output shaft AW1 are thus driven at the same rotational speed.

In a generator mode of the first electric machine EM1 this is driven via the internal combustion engine VM, wherein a drive torque generated by the internal combustion engine VM is transmitted via the transmission gear stage to the first electric machine EM1. As a result, the first electric machine EM1, which is configured as a generator, is driven and generates electrical energy which is stored in an energy supply unit 6, for example an electrical accumulator.

Optionally, in a motor mode of the first electric machine EM1 a further output torque may be generated by the first electric machine EM1, wherein the first electric machine EM1, which is configured as an electric motor, is supplied with electrical energy by the energy supply unit 6.

The internal combustion engine VM and the first electric machine EM1 may in this case act together on the powertrain EM1 so that a parallel hybrid drive is implemented.

The transmission gear G1 has an output gear BR1 which is in engagement with the further drive gear AR2 via an intermediate gear ZR. The output gear BR1 is arranged fixedly in terms of rotation on the further transmission gear output shaft AW2 and forms therewith a pump power take-off 5, for example, for a main pump P1, a lubrication and/or cooling pump P2 and a steering pump P3. Moreover, the transmission gear G1 has a further output gear BR2 which is in engagement with the drive gear AR1. The further output gear BR2 is arranged fixedly in terms of rotation on the further transmission gear output shaft AW3 and forms therewith a pump power take-off 5, for example, for a constant gear pump P3.

Moreover, the first powertrain 2 has a further transmission gear G2 for transmitting the output torque acting on the transmission gear output shaft AW1 to the power take-off 4. For example, the further transmission gear G2 is configured as a PTO transmission. The further transmission gear G2 has a drive ring gear AH1 and a further drive ring gear AH2, wherein the transmission gear output shaft AW1 is guided coaxially through the two drive ring gears AH1, AH2. The transmission gear output shaft AW1 in this case is selectively couplable fixedly in terms of rotation via a first coupling element KE1 to one of the two drive ring gears AH1, AH2.

The two drive ring gears AH1, AH2 are in engagement with an intermediate stepped gear SR1 with different gear ratios. Moreover, the further transmission gear G2 has a further intermediate stepped gear SR2, wherein the stepped gear SR1 is in engagement with the further intermediate stepped gear SR2 via exactly one stage. Additionally, the further transmission gear G2 has an output ring gear BH1 and a further output ring gear BH2, wherein a power take-off shaft NW is guided coaxially through the two output ring gears BH1, BH2 for forming the power take-off 4. The two output ring gears BH1, BH2 in each case are in engagement with the further intermediate stepped gear SR1 with different gear ratios. The power take-off shaft NW is selectively couplable fixedly in terms of rotation to one of the two drive ring gears BH1, BH2 via a second coupling element KE2 so that, depending on the coupling position of the first and the second coupling element KE1, KE2, the output torque is able to be transmitted from the transmission gear output shaft AW1 to the power take-off shaft NW in four different gear stages.

The second powertrain 3 serves for driving the tractor. To this end, the second powertrain 3 has a driven vehicle axle 7, preferably a rear axle, which is connected in terms of gearing via a vehicle transmission G3 to a second electric machine EM2 including the power electronics. The second electric machine EM2 is configured as an electric motor, wherein the energy supply unit 6 provides electrical energy for the second electric machine EM2.

The vehicle transmission G3 has a vehicle transmission input shaft EW which is coupled in terms of drive to the second electric machine EM2. For example, the vehicle transmission input shaft EW is configured as a motor shaft of the second electric machine EM2. The vehicle transmission G3 has a vehicle transmission output shaft AW which forms a transmission output 8 for the vehicle axle 7 and a further transmission output 9 for a further vehicle axle, not shown.

The vehicle transmission G3 is configured as a dual clutch transmission, wherein the vehicle transmission G3 has a first and a second coupling device K1, K2 for coupling the second electric machine EM2 at least to the vehicle axle 7. The two coupling devices K1, K2 are configured in each case as a multiplate clutch, wherein the first coupling device K1 is assigned to the vehicle transmission input shaft EW and the second coupling device K2 is assigned to the vehicle transmission output shaft AW. In this case an external plate carrier of the first coupling device K1 is connected fixedly in terms of rotation to the vehicle transmission input shaft EW and an external plate carrier of the second coupling device K2 is connected fixedly in terms of rotation to the vehicle transmission output shaft AW.

The vehicle transmission G3 has a planetary gear 10 which has a ring gear HR, a sun gear SR, a planet carrier PT and a plurality of planet gears PR which are rotatably mounted on the planet carrier PT. The planetary gear 10 is arranged coaxially to the vehicle transmission output shaft AW, wherein the sun gear SR is configured as a stepped ring gear and the vehicle transmission output shaft AW is guided through the sun gear SR. The sun gear SR has a sun gear portion SA and a first spur gear portion SA2, wherein for forming a planetary stage the planet gears PR are in engagement, on the one hand, with the ring gear HR which is fixed to the housing and, on the other hand, with the sun gear portion SA. The internal plate carrier of the first coupling device K1 has a first toothed portion VA1 which is in engagement with the first spur gear portion SA1 for forming a first spur gear stage. For example, the first toothed portion VA1 is formed by a spur toothing system arranged on the internal plate carrier of the first coupling device K1.

The vehicle transmission G3 has a first and a second switching element SE1, SE2, wherein the two switching elements SE1, SE2 are movably arranged on the vehicle transmission output shaft AW, axially between a switching position and a release position, and fixedly in terms of rotation in the direction of rotation. The first switching element SE1 serves for coupling the planet carrier PT fixedly in terms of rotation to the vehicle transmission output shaft AW. The second switching element SE2 serves for coupling the sun gear SR, in particular the first spur gear portion SA1, fixedly in terms of rotation to the vehicle transmission output shaft AW.

The vehicle transmission input shaft EW has a second spur gear portion SA2 and an inner plate carrier of the second coupling device K2 has a second toothed portion VA2, wherein the second spur gear portion SA2 and the second toothed portion VA2 are in engagement with one another for forming a second spur gear stage. Thus the vehicle transmission G3, which is configured as a dual clutch transmission, has two spur gear stages and a planetary stage with different gear ratios in each case.

The vehicle transmission output shaft AW is connected in terms of gearing at the point of the transmission output 8 to a differential transmission 11, in particular a rear axle differential, wherein the differential transmission 11 distributes the drive torque of the second electric machine EM2 to two vehicle wheels 12a, b, in particular rear wheels.

The further vehicle axle is couplable via a further coupling device K3 to the vehicle transmission output shaft AW, in particular for implementing an all-wheel drive. To this end, the further coupling device K3 is configured as a further multiplate clutch. At the point of the further transmission output 9 the vehicle transmission output shaft AW has a further spur gear portion SA3, wherein a coupling half of the further coupling device K3 has a further toothed portion VA3. The further spur gear portion SA3 and the further toothed portion VA3 are in engagement with one another for forming a further spur gear stage.

Figure 2A:
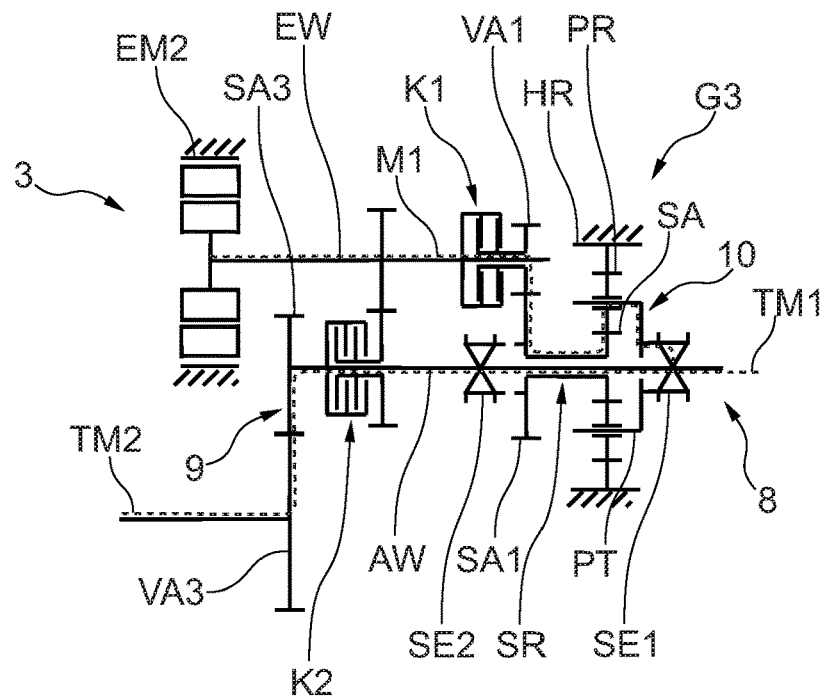
FIGS. 2a and 2b show a schematic view of a vehicle transmission of the drive arrangement of FIG. 1 in two different switching states.

FIGS. 2a, b and 3 show in each case a torque path of the first powertrain 3 for different switching states of the vehicle transmission G3. Depending on the switching state of the two switching elements SE1, SE2 and the two coupling devices K1, K2, a total of three different gear stages may be represented with different gear ratios. Optionally a third switching element, not shown, and a third spur gear stage, not shown, may be supplemented by a fourth gear ratio for a fourth gear stage.

In FIG. 2a the vehicle transmission G3 is switched, for example, into a first gear stage. To this end, the first coupling device K1 is closed and the second coupling device K2 is opened, wherein the first switching element SE1 is arranged in the switching position and the second switching element SE2 is arranged in the release position. In this case, the vehicle transmission input shaft EW is coupled via the first coupling device K1 and the sun gear SR to the planetary gear 10, wherein the planet carrier PT is connected via the first switching element SE1 fixedly in terms of rotation to the vehicle transmission output shaft AW. In an operating state of the second electric machine EM2, therefore, a torque path M1 runs from the vehicle transmission input shaft EW via the first coupling device K1, the first spur gear stage and the planetary stage to the vehicle transmission output shaft AW, wherein the torque path M1 is divided into a first partial torque path TM1 in the direction of the transmission output 8 and into a second partial torque path TM2 in the direction of the further transmission output 9. The second partial torque path TM2 runs in this case via the further spur gear stage to the further coupling device K3, wherein by closing the further coupling device K3 the further vehicle axle may be connected-in for the all-wheel drive.

Figure 2B:
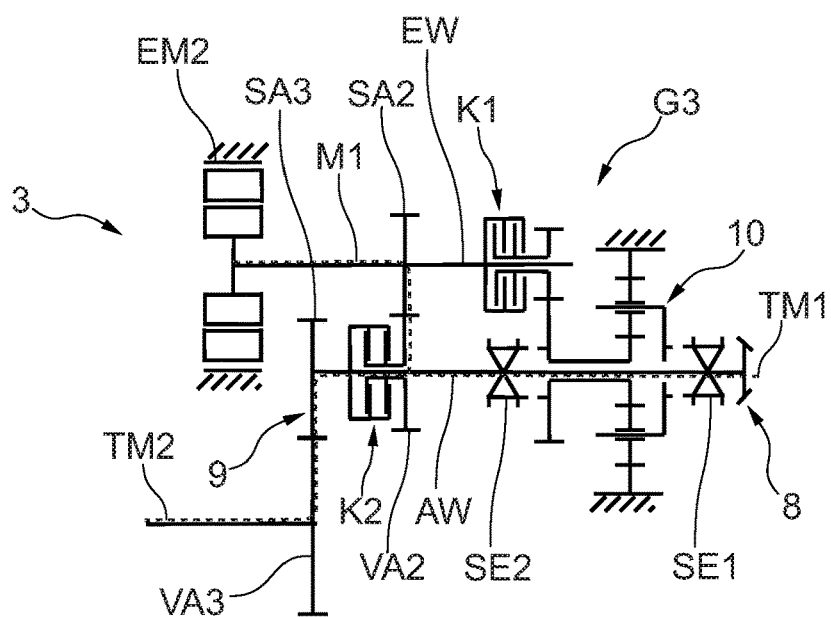

In FIG. 2b the vehicle transmission G3 is switched, for example, into a second gear stage. To this end, the first coupling device K1 is opened and the second coupling device K2 is closed, wherein the two switching elements SE1, SE2 are arranged in each case in the release position. In this case, the vehicle transmission output shaft AW is coupled via the second coupling device K2 to the second spur gear portion SA2. In the operating state of the second electric machine EM2, therefore, the torque path M1 runs from the vehicle transmission input shaft EW via the second spur gear stage and the second coupling device K2 to the vehicle transmission output shaft AW, wherein the torque path M1 is subsequently divided into the first and the second partial torque path TM1, TM2, as already described above.

Figure 3:
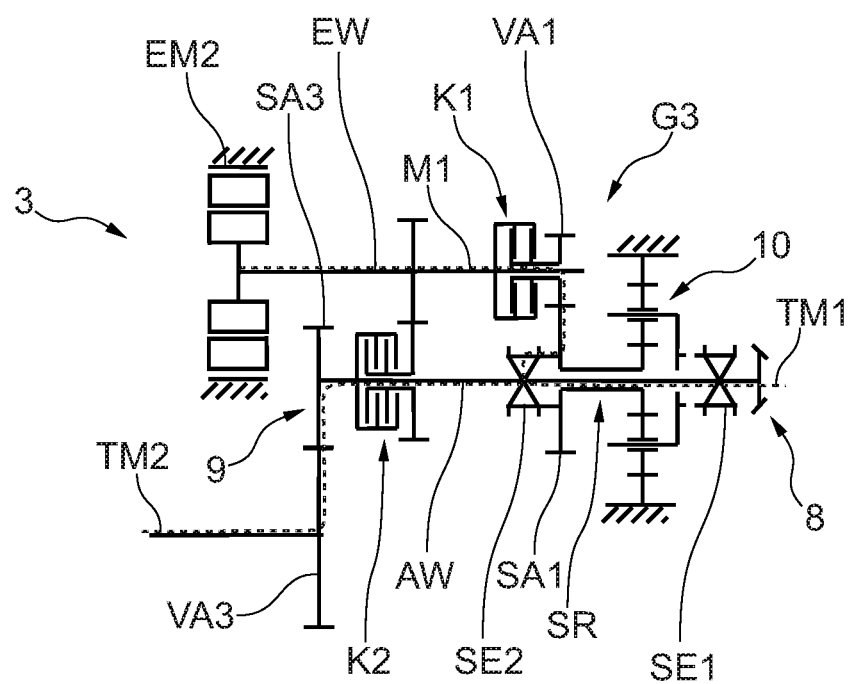
FIG. 3 shows in the same view as in FIGS. 2a, b the vehicle transmission in a further switching state.

In FIG. 3 the vehicle transmission G3 is switched, for example, into a third gear stage. To this end, the first coupling device K1 is closed and the second coupling device K2 is opened, wherein the first switching element SE1 is arranged in the release position and the second switching element SE2 is arranged in the switching position. In this case, the vehicle transmission input shaft EW is coupled to the sun gear SR via the first coupling device K1, wherein the first spur gear portion SA1 is connected via the second switching element SE2 fixedly in terms of rotation to the vehicle transmission output shaft AW. In the operating state of the second electric machine EM2, therefore, the torque path M1 runs from the vehicle transmission input shaft EW via the first coupling device K1 and the first spur gear stage to the vehicle transmission output shaft AW, wherein the torque path M1 is subsequently divided into the first and the second partial torque path TM1, TM2, as already described above.

Figure 4:
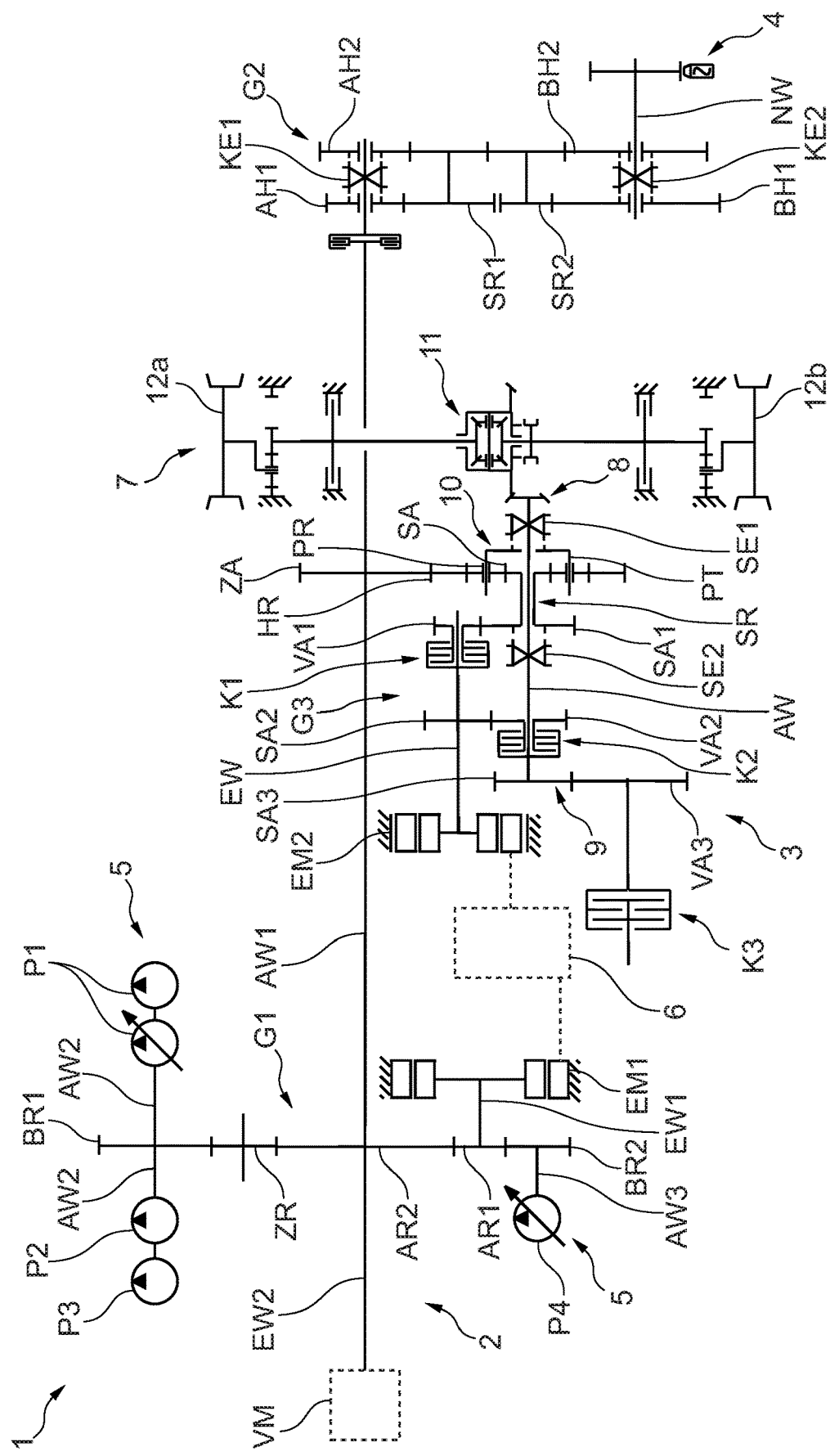
FIG. 4 shows a schematic view of the drive arrangement as an alternative exemplary embodiment of the invention.

FIG. 4 shows in a highly schematic view an alternative embodiment of the drive arrangement 1 as has already been described above in FIG. 1. In this case, the drive arrangement 1 differs from the embodiment described in FIG. 1, in that the first and the second powertrains 2, 3 are connected together in terms of gearing. To this end, the ring gear HR is rotatable about the vehicle transmission output shaft AW, wherein the vehicle transmission output shaft AW1 has a gearwheel portion ZA which is in engagement with the ring gear HR. For example, the gearwheel portion ZA is configured as a spur gear which is connected fixedly in terms of rotation to the transmission gear output shaft AW1. The ring gear HR has on its external circumference an external toothing via which the gearwheel portion ZA meshes with the ring gear HR.

Figure 5:
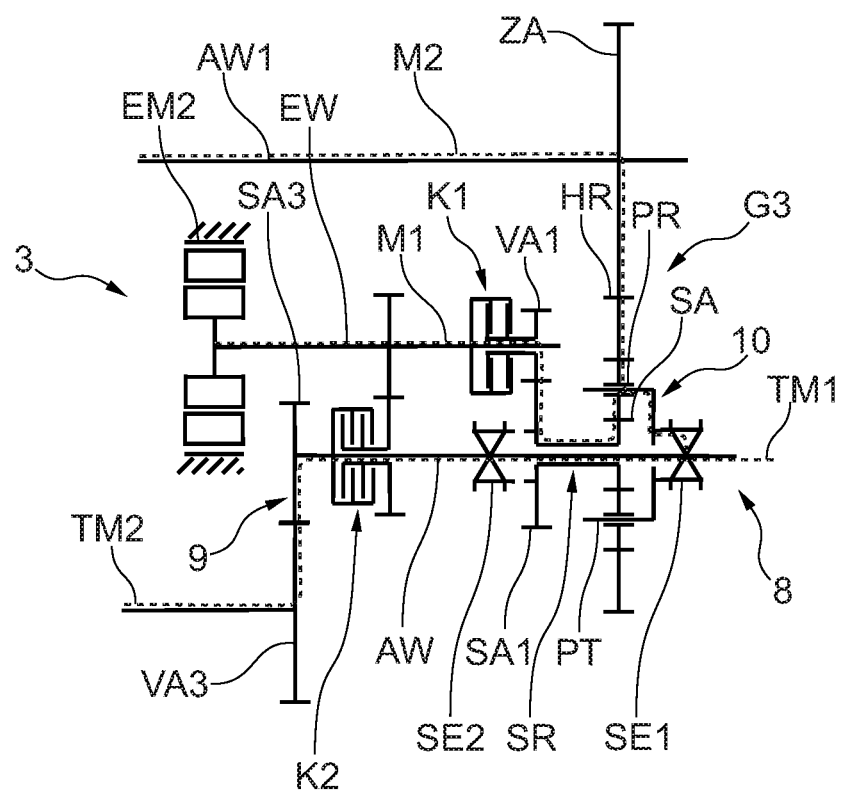
FIG. 5 shows a schematic view of the vehicle transmission of the drive arrangement of FIG. 2 in a switching state.

In the first gear stage, the SE1 is in the switching position as shown in FIG. 5, wherein the torque path M1, as already described in FIG. 2a, runs via the planetary gear 10 to the vehicle transmission output shaft AW. Additionally, a further torque path M2 runs from the transmission gear output shaft AW1 via the gearwheel portion ZA to the ring gear HR and thus into the planetary gear 10. In this case the planetary gear 10 serves as a summation gear, wherein the torques of the two torque paths M1, M2 are combined in the planetary gear 10 and transmitted via the switching elements SE1 to the vehicle transmission output shaft AW or divided into the two partial torque paths TM1, TM2. As a result, a power split is implemented in the first gear stage, wherein by combining the drive torques of the first and the second powertrain 2, 3 or the powers of the internal combustion engine VM and/or the first electric machine EM1 and the second electric machine EM2, a greater efficiency may be achieved in the first gear stage.

LIST OF REFERENCE NUMERALS

1 Drive arrangement
2 First powertrain
3 Second powertrain
4 Power take-off
5 Pump power take-off
6 Energy supply unit
7 Vehicle axle
8 Transmission output
9 Further transmission output
10 Planetary gear
11 Differential transmission
12a, b Vehicle wheels
AH1 Drive ring gear
AH2 Further drive ring gear
AW Vehicle transmission output shaft
AW1 Transmission gear output shaft
AW2 Further transmission gear output shaft
AW3 Further transmission gear output shaft
AR1 Drive gear
AR2 Further drive gear
BH1 Further output ring gear
BH2 Further output ring gear
BR1 Output gear
BR2 Further output gear
EM1 First electric machine
EM2 Second electric machine
EW Vehicle transmission input shaft
EW1 Transmission gear input shaft
EW2 Further transmission gear input shaft
G1 Transmission gear
G2 Further transmission gear
G3 Vehicle transmission
HR Ring gear
K1 First coupling device
K2 Second coupling device
K3 Further coupling device
KE1 First coupling element
KE2 Second coupling element
M1 Torque path
M2 Further torque path
NW Power take-off shaft
P1 Main pump
P2 Lubrication/cooling pump
P3 Steering pump
P4 Gear pump
PR Planet gears
PT Planet carrier
SA Sun gear portion
SA1 First spur gear portion
SA2 Second spur gear portion
SA3 Further spur gear portion
SR Sun gear
SR1 Stepped ring gear
SR2 Further stepped ring gear
TM1 First partial torque path
TM2 Second partial torque path
VA1 First toothed portion
VA2 Second toothed portion
VA3 Further toothed portion
VM Internal combustion engine
ZR Intermediate gear
ZA Gearwheel portion

The invention claimed is:

1. A drive arrangement for a tractor, comprising:
a first powertrain having a power take-off for driving a couplable attachment unit and/or having a pump power take-off for driving at least one hydraulic pump;
a second powertrain having a vehicle transmission with at least one transmission output for driving at least one vehicle axle;
a first electric machine and a second electric machine, wherein the first electric machine is coupled and/or couplable in terms of drive to the first powertrain and the second electric machine is coupled and/or couplable in terms of drive to the second powertrain; and
a vehicle transmission input shaft for forming a transmission drive;
a vehicle transmission output shaft for forming the at least one transmission output;
a planetary gear having a with a sun gear, a ring gear, a planet carrier, and a plurality of planet gears rotatably mounted on the planet carrier, wherein the sun gear has a sun gear portion and a first spur gear portion;
a first switching element and a second switching element each movable between a release position and a switching position, wherein the first switching element in the switching position couples the vehicle transmission input shaft to the vehicle and couples the transmission output shaft for forming at least one transmission output fixedly in terms of rotation so that a torque path runs from the vehicle transmission input shaft to the vehicle transmission output shaft, and wherein the second switching element in the switching position fixedly couples the planetary gear in terms of rotation to the vehicle transmission output shaft, so that the torque path runs from the vehicle transmission input shaft via the first spur gear portion to the vehicle transmission output shaft.

2. The drive arrangement of claim 1, further comprising an internal combustion engine, wherein at least one of the first and second electric machines can be operated in a generator mode and is operatively connected to the internal combustion engine for generating electrical energy.

3. The drive arrangement of claim 2, wherein:
the first electric machine is configured at least as a generator and the second electric machine is configured as an electric motor;
the first powertrain can be driven at least by the internal combustion engine and the second powertrain can be driven by the second electric machine configured as an electric motor; and
the first electric machine is operatively connected to the internal combustion engine and in a generator mode provides electrical energy for the second electric machine.

4. The drive arrangement of claim 2, wherein
the first electric machine is configured as an electric motor and the second electric machine is configured at least as a generator;
the first powertrain can be driven by the first electric machine which is configured as an electric motor;
the second powertrain can be driven at least by the internal combustion engine; and
the second electric machine is operatively connected to the internal combustion engine and in a generator mode provides electrical energy to the first electric machine.

5. The drive arrangement of claim 1, wherein each of the first and second electric machines is configured as an electric motor, wherein the first powertrain can be driven by the first electric machine and the second powertrain can be driven by the second electric machine.

6. The drive arrangement of claim 1, further comprising an energy supply unit configured for storing and/or providing electrical energy, wherein the first and the second electric machines are connected in terms of supply technology to the energy supply unit.

7. The drive arrangement of claim 1, wherein the first and the second powertrains are separated from one another in terms of gearing.

8. The drive arrangement of claim 1, wherein the first powertrain is connected and/or connectable to the second powertrain in terms of gearing via the vehicle transmission so that drive torques of the first and the second powertrains can be added together.

9. The drive arrangement of claim 1, wherein the vehicle transmission comprises:
a first coupling device assigned to the vehicle transmission input shaft; and
a second coupling device assigned to the vehicle transmission output shaft;
wherein a coupling half of the first coupling device has a first toothed portion, the first toothed portion connected via at least one gear stage to the vehicle transmission output shaft; and
wherein a coupling half of the second coupling device has a second toothed portion, the second toothed portion connected via at least one further gear stage to the vehicle transmission input shaft.

10. The drive arrangement of claim 9, wherein:
the sun gear portion is in engagement with the planet gears for forming a planetary stage; and
the first spur gear portion is in engagement with the first toothed portion of the first coupling device for forming a first spur gear stage.

11. The drive arrangement of claim 10, wherein:
the first switching element in the switching position couples the vehicle transmission output shaft to the vehicle transmission input shaft via the planet carrier; and
the second switching element in the switching position couples the first spur gear portion to the vehicle transmission output shaft.

12. The drive arrangement of claim 11, wherein:
the first powertrain has a gearwheel portion and the ring gear has external toothing;
the gearwheel portion is in engagement and/or may be brought into engagement with the external toothing of the ring gear for connecting the first powertrain to the second powertrain in terms of gearing; and
in the switching position of the first switching element a further torque path runs from the first powertrain via the gearwheel portion to the planetary gear.

13. The drive arrangement of claim 10, wherein the vehicle transmission input shaft has a second spur gear portion, the second spur gear portion in engagement with the second toothed portion of the second coupling device for forming a second spur gear stage, so that in a closed state of the second coupling device a torque path runs from the vehicle transmission input shaft via the second spur gear stage to the vehicle transmission output shaft.

14. The drive arrangement of claim 1, further comprising a transmission output for driving at least one further vehicle axle, wherein the further vehicle axle is connected via a further coupling device to the further transmission output, so that in a closed state of the further coupling device the further vehicle axle is driven and in an open state of the further coupling device the further vehicle axle is not driven.

15. The drive arrangement of claim 14, wherein the vehicle transmission output shaft has a further spur gear portion and a coupling half of the further coupling device has a further toothed portion, wherein the further spur gear portion and the further toothed portion are in engagement with one another for forming a further spur gear stage.

* * * * *